(12) United States Patent
Melet

(10) Patent No.: US 10,662,638 B2
(45) Date of Patent: May 26, 2020

(54) CONSTRUCTION ELEMENT INCORPORATING AN ELECTRONIC SYSTEM AND METHOD FOR THE PRODUCTION THEREOF

(71) Applicant: Rolland Melet, Flayosc (FR)

(72) Inventor: Rolland Melet, Flayosc (FR)

( * ) Notice: Subject to any disclaimer, the term of this patent is extended or adjusted under 35 U.S.C. 154(b) by 353 days.

(21) Appl. No.: 15/520,477

(22) PCT Filed: Sep. 16, 2015

(86) PCT No.: PCT/FR2015/000183
§ 371 (c)(1),
(2) Date: Apr. 20, 2017

(87) PCT Pub. No.: WO2016/051030
PCT Pub. Date: Apr. 7, 2016

(65) Prior Publication Data
US 2017/0306611 A1    Oct. 26, 2017

(30) Foreign Application Priority Data

Oct. 2, 2014 (FR) .................................... 14 02219

(51) Int. Cl.
*E04B 1/343* (2006.01)
*G06K 19/077* (2006.01)
(Continued)

(52) U.S. Cl.
CPC ...... *E04B 1/34384* (2013.01); *B28B 23/0031* (2013.01); *F16M 13/005* (2013.01);
(Continued)

(58) Field of Classification Search
CPC ...... E04B 1/343; E04B 1/34384; E02D 29/14
See application file for complete search history.

(56) References Cited

U.S. PATENT DOCUMENTS

| 7,804,406 | B2 | 9/2010 | Kaga et al. |
| 2008/0067228 | A1 | 3/2008 | Kaga et al. |

(Continued)

FOREIGN PATENT DOCUMENTS

| EP | 1 909 218 A1 | 4/2008 |
| FR | 2 977 583 A1 | 1/2013 |

(Continued)

OTHER PUBLICATIONS

International Search Report and Written Opinion dated Jan. 18, 2016 issued in corresponding application No. PCT/FR2015/000183; w/ English translations (20 pages).
(Continued)

*Primary Examiner* — Jacob T Minskey
*Assistant Examiner* — Cedrick S Williams
(74) *Attorney, Agent, or Firm* — Seckel IP, PLLC

(57) ABSTRACT

The invention relates to an assembly for incorporating into a solidified construction element, to a construction element comprising such an assembly, and to a method for producing said construction element. According to the invention, the assembly comprises an electronic system (1), said system (1) comprising a chip. It is characterised in that it also comprises a support part (2) provided with a positioning element (3) for said system (1) on one (4) of the so-called system-receiving faces thereof, and on the face (5) opposing said receiving face (4), a distinctive sign for locating the electronic system, which is visible from outside the construction element.

20 Claims, 7 Drawing Sheets

Figure 1:
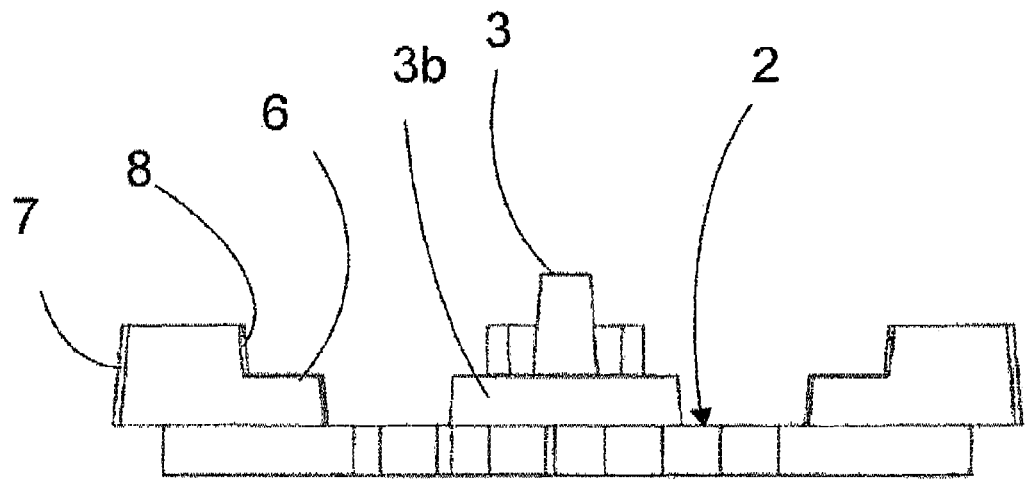
Figure 2:
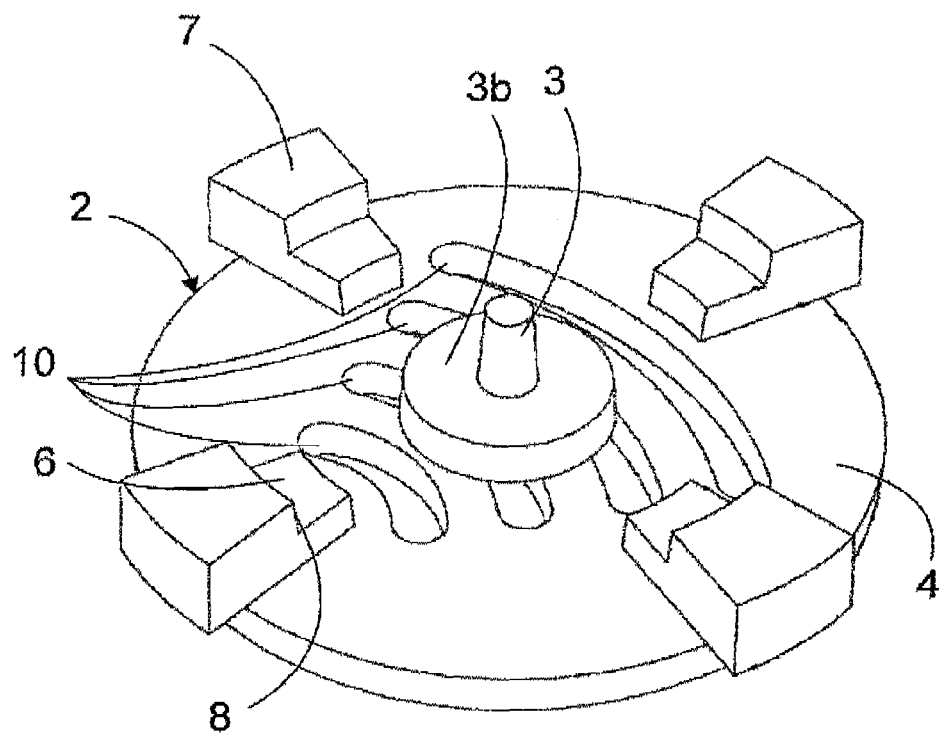
Figure 3:
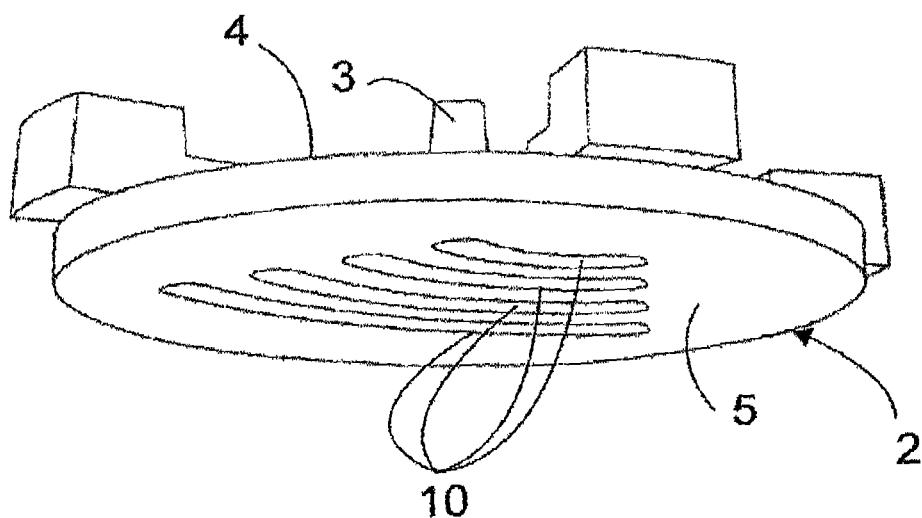
Figure 4:
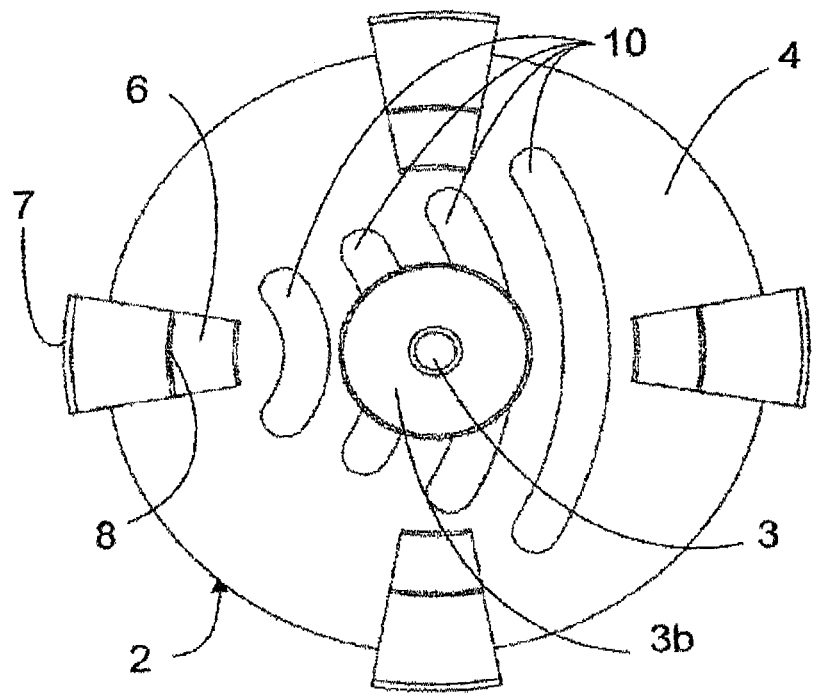

(51) Int. Cl.
*B28B 23/00* (2006.01)
*F16M 13/00* (2006.01)
*G01C 9/06* (2006.01)
*G01S 13/12* (2006.01)
*G04G 21/04* (2013.01)

(52) U.S. Cl.
CPC ................ *G01C 9/06* (2013.01); *G01S 13/12* (2013.01); *G06K 19/077* (2013.01); *G06K 19/07749* (2013.01); *G04G 21/04* (2013.01)

(56) References Cited

U.S. PATENT DOCUMENTS

| | | | |
|---|---|---|---|
| 2009/0072978 A1 | 3/2009 | Tilson, Jr. | |
| 2014/0030026 A1* | 1/2014 | Kiest, Jr. ............... | E02D 29/128 405/184.2 |

FOREIGN PATENT DOCUMENTS

| | | |
|---|---|---|
| JP | 2005-267227 A | 9/2005 |
| JP | 2008-137284 A | 6/2008 |

OTHER PUBLICATIONS

International Preliminary Report on Patentability Chapter I dated Apr. 4, 2017 issued in corresponding application No. PCT/FR2015/000183; w/ English translation (15 pages).

\* cited by examiner

CONSTRUCTION ELEMENT INCORPORATING AN ELECTRONIC SYSTEM AND METHOD FOR THE PRODUCTION THEREOF

This invention relates to a construction element comprising an electronic system and the method for the production thereof. An electronic system is any electronic system for which positioning in the construction element is important for its correct operation. In particular it relates to contactless electronic transmission systems in the form of an RFID type of electronic radio frequency identification label, particularly of the RFID (Radio Frequency IDentification), NFC (Near Field Communication) type and systems using technologies according to the "Bluetooth" standard for two-directional information exchanges at very short distance using UHF (Ultra High Frequency) radio waves, particularly at low energy, for example technologies known as BLE (Bluetooth Low Energy), or such a system connected particularly by wire connection means to any surface of the construction element for transmission of data. In one example it may be a sensor of different parameters internal or external to the construction element, particularly movement pressure, by accelerometer or temperature.

In particular, such an electronic system can capture information, store it and restore it, for example from a short distance to a user due to the presence of an element in the system that for example transmits radio waves.

In most embodiments of such a system, it is in the form of a label or a flat object incorporating a chip, an antenna with a self-sticking piece of paper or vinyl so that it can adhere to the construction element that supports it. In one preferred application, the construction element is an object located in a public area, in which passers by or locomotion means are likely to pass close to the element.

A user can communicate with such a transmitting system, for example using a portable terminal, for example a smartphone or a digital tablet equipped with a transmission system reader, for example an NFC reader if the transmitting system is an NFC label. In the case of an NFC label, the antenna of the system captures radio energy transmitted by the terminal when the terminal passes close to it. This energy supplies power to the system chip that can then exchange data with the terminal.

One preferred and non-limitative application of such an electronic system, for example a low range contactless electronic transmission system embedded in a construction element, is the emission of various information by this element that then acts as smart urban furniture dedicated to informing users by providing information relevant to the position of the construction element.

This is done by embedding the electronic system directly into the material of the construction element. This creates a number of difficulties as much with the instigating of this embedding as with positioning and finding the system in the future.

Positioning of an electronic system, for example a low range contactless transmitting system on a construction element located in a public area has to satisfy several prerequisites for location, robustness and positioning if it is to be really efficient.

Concerning the location and considering the example of an electronic transmission system in the form of an RFID label, and more particularly an NFC label, the RFID or NFC chip is capable of communicating with a terminal carried by a user, for example a portable phone, at a small distance called the near field less than about 10 cm in the open air. This distance is much less if the radio waves pass through a solid material, which is the case when the label is embedded inside the construction element.

The condition for maintaining a near field below a maximum value of the distance between the transmission system and the terminal requires that a user who wants to set up a connection between the terminal and the transmission system should know the location of this system in the construction element precisely so that he can position his terminal as close to the system as possible.

As the user can use a portable phone as a terminal capable of receiving transmissions from the system, it should be borne in mind that the user has not received any special training on how to optimize information exchanges with the system. Therefore the action of setting up a connection with the terminal needs to be as easy and intuitive as possible for the user.

This involves making the precise location of the electronic transmission system obvious, which can be materialized by the creation of a visible marking sign on the surface of the construction element containing or supporting the transmission system.

Concerning robustness, such a compact electronic system is inherently fragile, particularly when it is in the form of a label. However, elements and objects to be used in public areas have to be robust or at least reasonably insensitive to aggression due to the weather such as rain, heat, cold, to normal use such as friction or pressure, more or less deliberate aggression such as impacts or getting trapped, and finally malicious actions such as blows, scratching, tearing, etc. Therefore it is important that the electronic transmission system should be protected as robustly as possible.

Furthermore, if the transmission system is to be as operational as possible, not only does it have to be robust itself, but the connection with its support, for example a construction element or intermediate support, also needs to be robust. The most important factor, rather than that the system is extremely robust in itself, is that the degree of robustness of the system is the same as that of the element that supports it and therefore that the robustness of the assembly thus formed is coherent and homogeneous.

System positioning conditions are directly related to technical choices made to satisfy positioning and robustness constraints. The biggest positioning constraint is to guarantee that the connection between the terminal and the system is as efficient as possible, even through radio opaque materials.

It has been suggested that the electronic transmission system can be placed behind a protective film on the construction element that supports it. This means that the electronic system should be thin, but this may not always be the case. The film may or may not be transparent. If the film is transparent, this allows the user carrying the terminal to perfectly locate the system, and if it is not, the system can be located by the shape of the film.

Firstly, the use of such a film gives no information about the function of the system. Secondly, this proposal does not provide sufficient protection for the system and does not satisfy the required robustness criterion. The system protection film can be damaged if it is accessible or exposed to shocks: Even if a protection screen is provided for the film, the protection screen has to be transparent or it must identify the location of the system and must not be radio opaque. In all cases, the resistance of the system is related to the resistance of the means of adhesion of the protection film onto the construction element, which will often be glue. Therefore this first proposal is not satisfactory.

It has also been proposed that the electronic transmission system can be placed in a self-sticking structure on the construction element, this self-sticking structure being a plastic film surrounding the system. At least one face of the structure can indicate the presence of the system by printing or any other equivalent marking technique on a thin support.

The same advantages for determining the location of or finding the electronic system are obtained as with the previous technique with a protective film. This second proposal has the same disadvantages regarding robustness and strength as the previous proposal. Although this second proposal facilitates positioning of the system, it does not satisfy the robustness criterion.

Finally, in order to provide efficient protection for the electronic system, it has been proposed that the system can be embedded in a protective structure and fixed to the surface or in a recess formed in the construction element.

Localization is achieved because the protective structure is visible in the support or in the recess. Marking of the protective structure can also significantly improve localization of the electronic transmission system. However, considering the mechanical robustness and strength of the structure, even assuming that the protective structure is well designed to resist all atmospheric aggression, it will still be exposed to some accidental aggression and to malicious actions such as disassembly attempts. Therefore this first proposal is not satisfactory either.

Moreover, for this third proposal, placement of the system in an encapsulated mode inside a recess formed in the construction element supporting it requires very careful and special action, particularly machining or precise molding of the recess in the surface of the support object, then very precise molding and manufacturing of the protective structure, such that one fits well into the other. This requires a high degree of precision that increases the fabrication cost of the construction element and electronic transmission system assembly.

Document EP-A-1 909 218 describes a concrete module inside which one or several RFID labels are embedded containing information about the concrete. However, this document does not describe any means of positioning the RFID label in the module, nor any means of protecting the label while the module is being fabricated. Moreover, the RFID label is only used to provide information about parameters related to the concrete transmitted to a terminal used those skilled in the art. It follows that an RFID label thus embedded into a concrete module cannot perform the role of transmitting information for users who are not necessarily specialists in reading such labels, considering that the label would have to be easily located by users who want to make exchanges with it, which cannot be the case with labels thus positioned in the module described in this document.

Document FR-A-2 977 583 describes a method of making a hydraulic composition including steps to mix a hydraulic binder and water to form a mix in the fresh state containing radio frequency identification labels; these labels containing information about a future addition of water and/or additive to obtain a concrete with particular rheological conditions or mechanical strength. In this document, as in the previous document, the methods of positioning, protection, localization or finding the labels are not considered because they are not crucial for the required use as described in this document.

The problem that this invention aims to solve is to disclose a simple and practical method of providing a construction element with at least one electronic transmission system to set up communication with one or more terminals possibly outside the construction element but in its vicinity, the electronic system having to be positioned robustly on this construction element while allowing it to transmit satisfactorily to the terminal(s) and be easily found from the outside.

This is achieved according to the invention by an assembly that will be embedded in a solidified construction element, said assembly comprising an electronic system, said system comprising a chip, characterized in that said assembly also comprises a support part provided with an element for positioning said transmission system on one of its faces called the reception face of the system, and on the face opposite said reception face, a distinctive sign for identifying the location of the electronic system that can be seen from outside the construction element.

The technical effect thus obtained is the ability to satisfy contradictory requirements while use of the transmission system remains simple and practical.

The first requirement satisfied by the assembly is that installation is easy and reliable when the construction element is being fabricated. The electronic system that can be small and have a fragile design, is supported by a support part advantageously with larger dimensions and therefore that can be positioned more reliably in the construction element during fabrication of this element, particularly because the support part is also held in place relative to the mold. The electronic system is held in place relative to the support part in three dimensions, the positioning element being protected by the support part. This prevents any risk of the system slipping during production of the construction element, for example by penetration into the construction element that will subsequently attenuate waves transmitted by the system when the electronic system is a contactless low range electronic transmission system.

The second requirement satisfied by the assembly is that it efficiently protects the electronic system. This is achieved by the support part that retains the electronic system by the positioning element and protects it by the reception surface. The support part and its system are embedded in the construction element which provides optimum protection for the system against all sorts of external aggression. Advantageously, a support device, for example an adhesive layer, also temporarily contributes to protection of the support part and its electronic system during fabrication of the construction element by acting as a protection and/or sealing plug between the mold and the support part.

The third requirement satisfied by the assembly is that it makes localization of the electronic system easy. This is achieved by the fact that the face of the support part opposite the reception face comprises a retaining device, for example and non-limitatively an adhesive layer that is used for temporarily positioning the assembly during fabrication of the construction element. Thus, the face opposite the reception face for the electronic system of the support part is flush with the surface of the construction element since it was temporarily brought into contact with the surface of the mold. This retaining device coupled to the support element can also reliably fix the position of the electronic system in the construction element. As a result, in the case of an electronic transmission system, in particular there is very little material of the construction element, essentially the thickness of the support part, between the electronic transmission system and the terminal outside the element that picks up waves transmitted by the system, and consequently transmission of waves between the system and the terminal is optimum.

Considering the fact that the face opposite the reception face of the support part positioned to be flush with the construction element, and due to its temporary solidarization with the wall of the mold, the assembly can easily be seen from outside by one or more potential users carrying one or more terminals, which makes it easy to find it and to position one or more terminals for optimum reception of transmitted waves when the system is a low range contactless transmission system.

Optionally, the invention also includes at least one of the following characteristics:

the electronic system is a low range contactless electronic transmission system also including a radio waves transmission antenna. The reception face comprises at least one bearing surface on which the electronic system is supported. The purpose of the support part is to enable efficient and long term positioning of the electronic system that must be held in place particularly during fabrication of the construction element, while protecting it. The use of a bearing surface reinforces the role of retaining the system on the support part, in addition to the retaining role also performed by the positioning element.

said at least one bearing surface is supported by a tab projecting from the reception face including a raised edge that stops in contact with a portion of the periphery of the electronic transmission system. The raised edge and particularly the presence of raised edges surrounding the system prevents any lateral or radial movement of the system relative to the support part and contributes to retaining the system relative to the support part.

the reception face comprises several bearing surfaces on which a corresponding portion of the transmission system is supported, the positioning element being at an equal distance from the bearing surfaces. The positioning element is thus placed to correspond with the center of the system and peripheral portions of the system bear on bearing surfaces of the support part, which retains it and keeps it stable.

the positioning element is a centering element in the form of a pin penetrating into a housing located in the middle of the electronic system, an auxiliary support for the lower face of the electronic transmission system being provided at the base of the pin. This prevents any radial movement of the electronic transmission system relative to the support part and gives better support for the electronic system on the support part due to the auxiliary support.

the support part has at least one anchor element projecting from the support part and designed to assure that the assembly is inserted deeply inside the construction element. The result is long term positioning of the combined system and part inside the construction element. The retaining device retains the support part in the mold before and during pouring/molding, in other words during fabrication of the construction element, the material of the element not yet being rigid and the assembly having the potential to move in the element as a result of pouring the material.

the support part comprises recesses passing through it from the reception face to the opposite face. The poured material can thus pass through the support part and hold it firmly in place while it sets.

the recesses form a structure that can be cellular. These recess shapes are such that the support part is not affected by forces while the material is being poured to fabricate the construction element, that could modify its position. The cellular shape helps to stiffen the structure and allow material for the construction element to flow through the support.

the retaining device may be a double-sided adhesive layer with one side of the layer adhering to the face opposite the reception face and the other side of the layer providing temporary support for the assembly during fabrication of the construction element. Such a double-sided adhesive layer facilitates detachment by moving the mold away from the first face of the layer while the second face is still solidarized to the support part. It also enables easy detachment of the second face of the layer by moving away from the support part.

the side of the layer adhering to the face opposite the reception face acts as a sealing and protection plug on the opposite face.

the face opposite the reception face of the support part has a distinctive identification and characterization sign of the electronic system. It is very advantageous if the support part and the electronic system can be found easily by one or more users equipped with a terminal close to the construction element. Due to the presence of this type of distinctive sign, the user can easily find the system and thus find a good position for reception of waves transmitted by the system in the case of an electronic transmission system, the precise location of the electronic system being identified by the distinctive sign.

the electronic system is an electronic transmission system, either an NFC label or a radio frequencies label in near field communication. Such an NFC label is sufficient to transmit waves over a short range and is particularly well adapted to communication with a terminal in the form of a user's smartphone. The technology used is simple and intuitive so that a portable phone can be used for innovative purposes, in which the only essential requirement is that the telephone should be placed close to the electronic transmission system with which the user wants to interact, without needing to start an app on the phone.

According to another purpose of this invention, a construction element is disclosed based on a molded material that solidifies progressively during fabrication, characterized in that it comprises at least one such assembly internally, the face opposite the reception face of said at least one assembly being visible from outside the construction element. One particularly interesting application of such a construction element is smart urban furniture capable of interacting with the corresponding terminal of one or several nearby users.

Advantageously, the molded material is chosen to be one of the following materials, or a mix of these materials: cement concrete with or without the addition of plant materials, resin concrete, hydraulic concrete, a resin, a plastic or a mix of plastics. Other embodiments may include working, a projection, or three-dimensional printing.

The invention discloses a method of fabrication of such a construction element by molding, including the following steps:

positioning the electronic system on the reception face of the support part, place the support part and electronic system assembly in a mold corresponding to the construction element, on a wall of the mold with temporary adhesion of the assembly on the wall by the face of the support part opposite the reception face of the electronic system, for example by means of a retaining device formed from a double-sided adhesive, pour the material that will form the construction element into the mold, strip the construction element, detaching the face opposite the mold wall support part.

Figure 5:
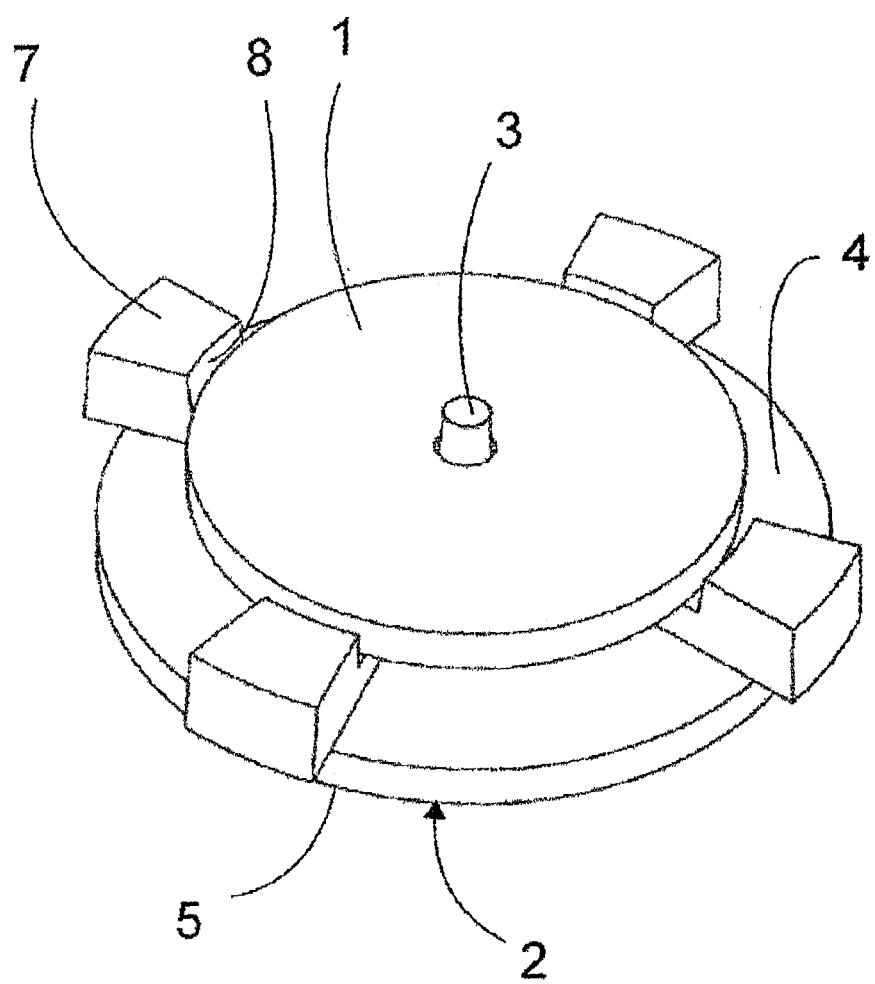
Figure 6:
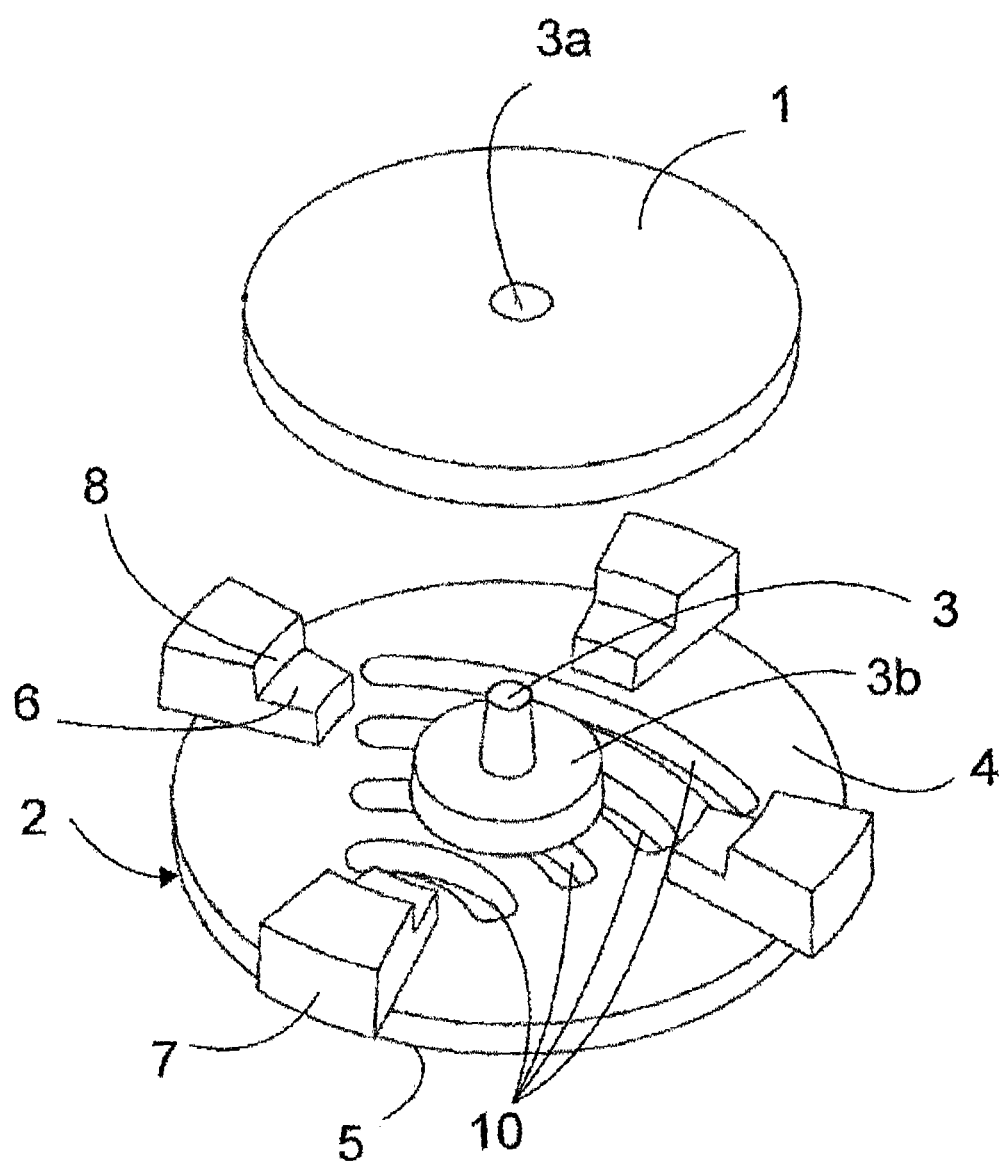

Other characteristics, purposes and advantages of this invention will become clear after reading the detailed description given below with reference to the appended drawings provided as non-limitative examples, and in which:

FIGS. 1 to 4 are diagrammatic representations showing a side view, a perspective top view, a top view and a perspective bottom view respectively of an embodiment of a support part forming part of an assembly according to this invention, the electronic transmission system also forming part of such an assembly not being shown on these figures, FIGS. 5 and 6 are diagrammatic views of an assembly composed of an electronic transmission system and a support part according to the embodiment shown in FIGS. 1 to 4, the electronic transmission system being shown positioned on the support part in FIG. 5, while it is shown at a distance from the support part in FIG. 6, FIGS. 7 to 9 are diagrammatic representations of a perspective top view with the electronic transmission system being and not being in position on the support part, and a perspective bottom view of an assembly according to another embodiment of this invention, respectively.

Throughout the following, a contactless electronic transmission system refers to any system capable of sending information, this system preferably comprising a chip and a radio wave emission antenna. The transmission system can also work in transmission and in reception, which has the advantage that system information can be updated. If an RFID label and more precisely an NFC label is preferred, this is no way limitative and the electronic transmission system can also be other than such labels. For example, transmission systems such as BLE beacons can be used, for which precise localization is more a question of transmission than localization by the user.

The construction element containing at least one such electronic transmission system can advantageously be used as smart urban furniture that can transmit various information to one or several terminals, preferably smartphones belonging to one or more users. The application can also be used to produce robust object/machine/information/service interfaces, for example such as insertion of an NFC label in a wall that will trigger a door lock. Furthermore, the transmission system may include a sensor of different parameters such as the temperature, pressure, acceleration or vibration.

However, application of this invention can be extended to include any use of electronic transmission systems used by qualified operators with terminals other than smartphones.

Thus, the electronic transmission system can also be used to provide information about the construction element, for example its conditions and its date of fabrication, and its component material. Therefore use of the electronic transmission system forming part of the construction element according to the invention is not limited to use in smart urban furniture.

With reference to all the figures, this invention applies to an assembly comprising mainly a low range contactless electronic transmission system 1. This assembly will be embedded inside a construction element during its fabrication.

In a known manner, the transmission system 1 includes a chip and a radio wave transmission antenna that may for example be an RFID or NFC label. It can also work in reception and receive information.

According to this invention, the assembly also comprises a support part 2 for reception of the transmission system. The support part 2 comprises a positioning element 3 advantageously to retain the electronic transmission system 1 in at least two directions relative to the support part 2. The positioning element 3 can penetrate into the transmission system 1 to index it relative to the support part 2. This support part 2 has a reception face for the transmission system 1, this face being called the reception face 4 in the following.

The face 5 of the support part 2 opposite the reception face 4 also comprises a retaining device, for example an adhesive layer that will temporarily position the assembly during fabrication of the construction element. This retaining device is designed to retain the construction element equipped with at least one such assembly with an electronic transmission system 1 and a support part 2, in position fixed to the wall of the mold used for fabrication.

In one embodiment of the invention, the retaining device is an adhesive layer, particularly a double-sided adhesive layer. Nevertheless, this is one device among others. In other examples, it may be a suction cup, a device operating by screwing, a magnet, or any other type of retaining means.

The construction element can be fabricated by molding of the element in the mold. Thus, one face 5 of the assembly is held in contact with the surface of the construction element during fabrication while guaranteeing that the remainder of the assembly is encapsulated in the material forming the construction element after the material has set.

Therefore the construction element is based on a poured or molded material that sets progressively during its fabrication, embedding at least one such transmission assembly 1 with its support part inside it. After fabrication, since the face 5 opposite the reception face 4 of the support part 2 has adhered through the retaining device to a wall of the mold, this opposite face 5 of said at least one assembly can be seen from outside the construction element.

Advantageously, the molded material is chosen to be one of the following materials, or a mix of these materials: cement concrete with or without the addition of plant materials, resin concrete, hydraulic concrete, a resin, a plastic or a mix of plastics.

This is not limitative and in general, the material used for the construction element can be any homogeneous or heterogeneous construction material that sets by various processes (action of time, temperature or chemical reaction, etc.) to form a more or less rigid coherent assembly.

Thus, according to the invention, a method of production of such a construction element by molding includes the following steps:

position the electronic transmission system 1 on the reception face 4 of the support part 2, place the support part 2 and electronic transmission system 1 assembly in a mold corresponding to the construction element, on a wall of the mold with temporary adhesion of the assembly on the wall by the face 5 of the support part 2 opposite the reception face 4 of the electronic transmission system 1, pour the material that will form the construction element into the mold, strip the construction element, detaching the opposite face 5 of the support part 2 from the mold wall, the support remaining fixed to the construction element.

The retaining device used is sufficiently strong to hold the support part 2 in place during fabrication of the construction element, while remaining easily detachable when the construction element is stripped. For example, it may be a double-sided adhesive, or any other means, for example a suction cup, screw device, a magnet or any other device provided only that it can retain the support part.

When the retaining device is a double-sided adhesive layer, which will be described more in more detail later, the face of the layer adhering to the mold is detached first and then the face of the layer adhering to the opposite face 5 of the support part 2 is detached. However, this order is not important.

During fabrication, there will be a vibration step of material that has not yet set to assure that it is well distributed, particularly in recesses provided on the support part 2, as will be described later.

Therefore the electronic transmission system 1 is positioned on the support part 2 by means of at least one positioning element 3 and forms an assembly that will be insert molded in the construction element The electronic transmission system 1 can also be provided with protective encapsulation before it is positioned in the support part 2. This might be desirable when the electronic transmission system is fragile, for example an RFID or NFC label.* It is also possible to encapsulate the electronic transmission system 1 and support part 2 assembly before the construction element is inserted into the mold.

Such an electronic transmission system 1 and support part 2 assembly cannot be removed from the construction element thus cast, which makes it very resistant to external aggression.

For both embodiments illustrated on the figures, the reception face 4 of the support part 2 is approximately plane so that the electronic transmission system 1 will fit into it better. This reception face 4 of the support part 2 may comprise at least one bearing surface 6 on which the electronic transmission system 1 is supported.

In the figures, there are four bearing surfaces 6 uniformly distributed around the circumference of a circle corresponding to the periphery of the electronic transmission system 1 in the shape of a ring, but this is not limitative. Each bearing surface 6 is supported on a tab 7 projecting from the reception face 4. Each tab 7 also has a raised edge 8 stopping in contact with a portion of the periphery of the electronic transmission system 1, in the figures the edge of the ring formed by this electronic transmission system 1.

In the figures, only one of the four tabs is marked with reference 7. The same applies for the raised edge 8 and the bearing surface 6. The above description for the referenced elements also applies to all tabs, all raised edges and all bearing surfaces.

Thus, the electronic transmission system 1 bears on the bearing surfaces 6 kept in place radially by the raised edge 8 of each tab 7 supporting a corresponding bearing surface 6. The raised edges 8 cooperate with the positioning element 3 to radially retain the electronic transmission system 1 on the support part 2.

Therefore in the embodiments illustrated in the figures, the reception face 4 of the support part 2 comprises several bearing surfaces 6 on which a corresponding portion of the transmission system 1 is supported, the positioning element 3 being at an equal distance from the bearing surfaces 6. The bearing surfaces 6 and the positioning element 3 perfectly define the position of the electronic transmission system 1 relative to the support part 2. In the figures, the positioning element 3 is located at the center of the circle delimited by the tabs 7 and their raised edge 8.

In the embodiments illustrated in the figures, the positioning element 3 is a centering element in the form of a pin that penetrates into a housing 3*a* located at the center of the electronic transmission system 1. The electronic transmission system 1 is therefore retained at the middle of the system by the centering element 3, and at the periphery of the system 1 by the raised edges 8 of the tabs 7.

Advantageously, the base of the pin acting as centering element 3 comprises an auxiliary support 3*b* on which the lower face of the electronic transmission system 1 is supported, which contributes to holding the transmission system 1 in place on the reception face 4 of the support part 2, in addition to the bearing surface(s) 6.

The geometry of the support part 2 helps to control the position of the electronic transmission system 1 relative to the face of the construction element with which the opposite face 5 of the support part 2 is flush 2. For example, since the support part 2 supports the electronic transmission system 1 on the other side of the opposite face 5, the thickness of the support part 2 needs to be calculated so that it is strong enough to protect the electronic transmission system 1, while remaining sufficiently thin to avoid moving the electronic transmission system 1 too far from the face of the construction element so that waves are satisfactorily transmitted to the outside.

To give an idea of the scale, without it being limitative, the distance of the electronic transmission system 1 from the closest face of the construction element can be between 1 mm (sufficient distance to provide minimum protection for the system) and 8 mm, a distance at which waves can be transmitted through the construction element and be correctly received by the terminal of a user outdoors.

Furthermore, the shape of the support part 2 advantageously anchors the part into the material of the construction element when it is produced.

To achieve this, one or several anchor means may be provided that can be used individually or in combination. For example, at least one anchor element 9 can be provided on the support part 2, projecting from the support part 2, and designed to assure that the assembly is inserted deeply inside the construction element. Four anchor elements 9 are shown on the figures for each support part 2, only one of which is referenced, but this is not limitative.

Such an anchor element 9 may have a free end that can be engaged with reinforcing elements provided in the material of the construction element, for example reinforcing bars when the main material of the construction element is concrete. Thus, the free end of such an anchor element 9 can have a notch corresponding to the diameter of the reinforcing element of the material from which the construction element is made. This notch is used for the introduction of a portion of the reinforcing element so that the anchor element 9 is engaged with the reinforcing element.

To supplement or to replace the anchor elements 9, the support part 2 may include recesses 10, 10*a* passing through the reception face 4 to its opposite face 5. Poured material that will form the construction element when it has set, passes through the recesses 10, 10*a* and fills them. Thus, during the material setting process, the support part 2 and the electronic transmission system 1 are progressively held in place in the construction element.

Figure 7:
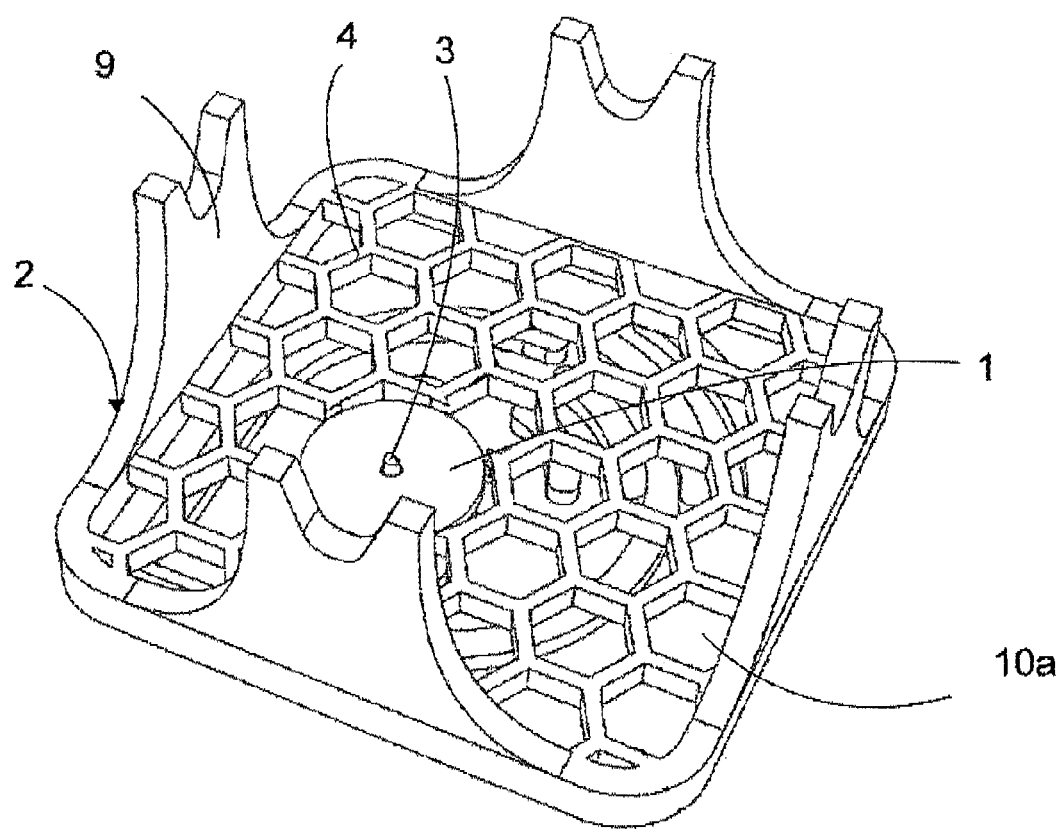
Figure 8:
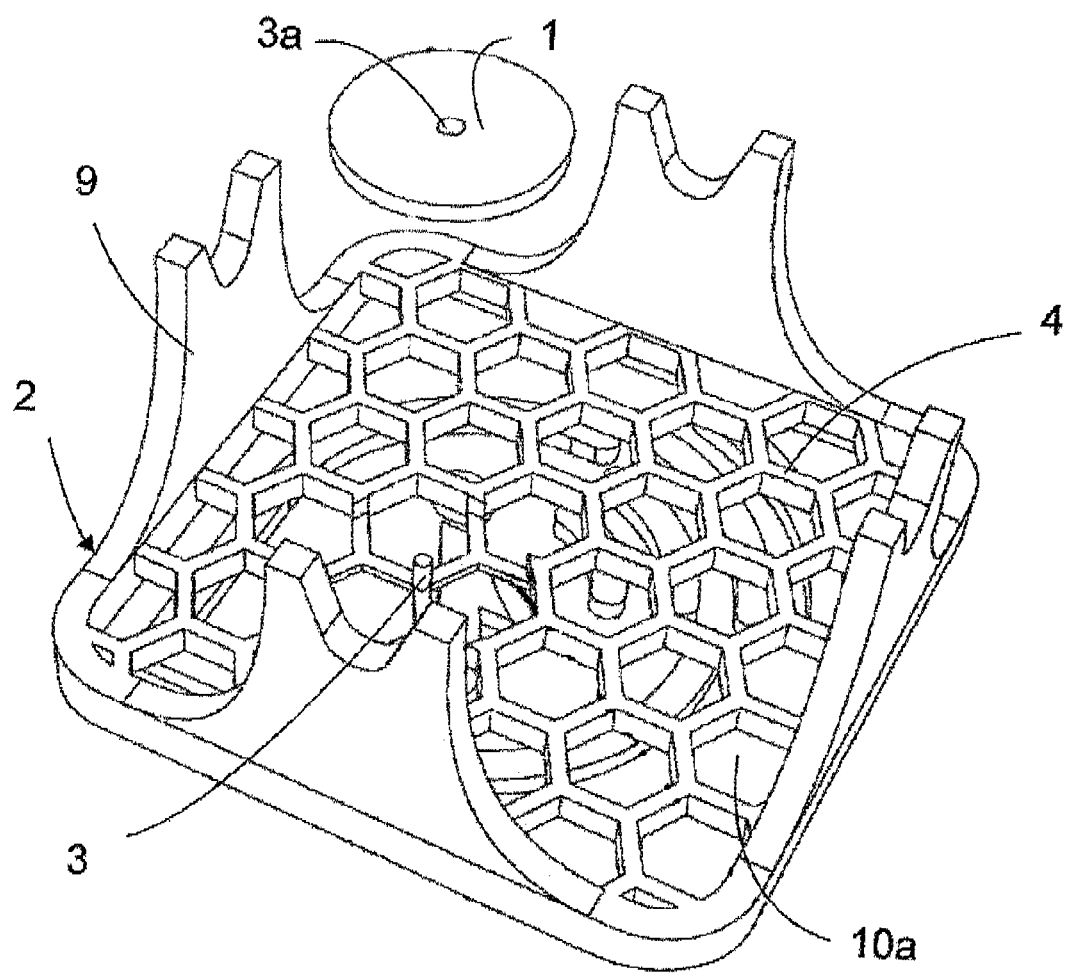
Figure 9:
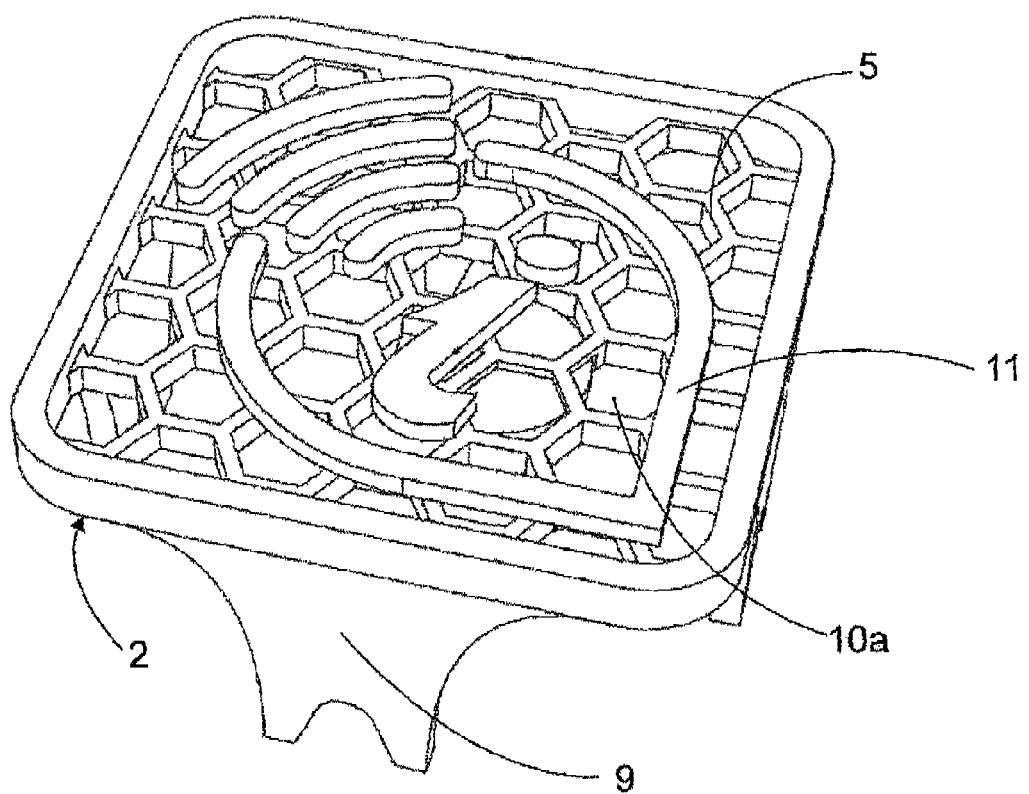

In FIGS. 7 to 9, the recesses shown form a cellular structure 10*a*.

As previously indicated, a retaining device will be used to temporarily position the assembly during fabrication of the construction element. For example, the retaining device is a double-sided adhesive layer, advantageously in the form of a double-sided film. One side of the layer can adhere to the face 5 opposite the reception face 4, and the other side of the layer can be used for temporary positioning of the assembly during fabrication of the construction element and therefore adhere to the wall of the mold used to fabricate the construction element.

The side of the layer adhering to the face 5 opposite the reception face 4 of the support part 2 acts as a sealing and protection plug on the opposite face 5 that may be provided with a distinctive sign, as will be described in detail later.

In this case, the double-sided adhesive layer placed on the opposite face 5 of the support part 2 acts as an attachment element of the support part 2 on the mold and as a sealing plug.

In an alternative embodiment, the support part 2 can be held in contact on the wall of the mold by a means other than by an adhesive, for example by pressure or by tension, the adhesive layer then acting mainly as a sealing plug.

As previously mentioned, the face 5 opposite the reception face 4 of the support part 2 is the face of the assembly composed of the electronic transmission system 1 and the support part 2, and the construction element that contains said assembly, that can be seen from the exterior. This opposite face is flush with the surface of the construction element.

This opposite face 5 should be suitable for the display of information such as the fact that the transmission system 1 is present. Consequently, this opposite face 5 is marked with a distinctive sign for finding and characterization 11 of the electronic transmission system 1. This marking sign, or target, can be seen from outside the construction element. In FIG. 9, this marking sign is the shape of the official logo of NFC devices. This sign is all that can be seen on the surface of the construction element. It is known by and therefore can be found by users. The compartments are embedded in the block.

It may be useful for the user if the opposite face and particularly the distinctive finding and characterization sign 11 can also provide information about the nature of displayed information and/or services provided after a connection has been set up between the terminal and the electronic transmission system 1.

The invention is not in any way limited to the embodiments described and illustrated that are only given as examples.

The invention claimed is:

1. An assembly intended to be embedded in a solidified construction element, the assembly comprising:
   an electronic comprising a chip, and
   a support part provided with (i) an element for positioning the system on one of the faces of the system, called the reception face of the system, and (ii) on the face opposite the reception face, a distinctive sign for identifying the location of the electronic system,
   wherein the distinctive sign can be seen from outside the construction element, and
   wherein the support part comprises recesses passing through the support part from the reception face to the opposite face.

2. The assembly according to claim 1, wherein the electronic system comprises a sensor.

3. The assembly according to claim 1, wherein the positioning element is a centering element in the form of a pin penetrating into a housing located in the middle of the electronic system, an auxiliary support for the lower face of the electronic transmission system being provided at the base of the pin.

4. The assembly according to claim 1, wherein the support part has at least one anchor element, projecting from the support part, and designed to be inserted inside the construction element.

5. The assembly according to claim 1, wherein the electronic system is an NFC (Near Field Communication) label.

6. The assembly according to claim 1, wherein the electronic system is a low range contactless electronic transmission system also including a radio waves transmission antenna.

7. The assembly according to claim 6, comprising a retaining device for temporarily positioning the assembly during fabrication of the construction element.

8. The assembly according to claim 6, wherein the reception face comprises at least one bearing surface on which the electronic system is supported, and wherein at least one bearing surface is supported by a tab projecting from the reception face including a raised edge that stops in contact with a portion of the periphery of the electronic system.

9. The assembly according to claim 6, wherein the positioning element is a centering element in the form of a pin penetrating into a housing located in the middle of the electronic system, an auxiliary support for the lower face of the electronic transmission system being provided at the base of the pin.

10. The assembly according to claim 6, wherein the support part has at least one anchor element, projecting from the support part, and designed to be inserted inside the construction element.

11. The assembly according to claim 1, comprising a retaining device for temporarily positioning the assembly during fabrication of the construction element.

12. The assembly according to claim 11, wherein the reception face comprises at least one bearing surface on which the electronic system is supported, and wherein at least one bearing surface is supported by a tab projecting from the reception face including a raised edge that stops in contact with a portion of the periphery of the electronic system.

13. The assembly according to claim 11, wherein the positioning element is a centering element in the form of a pin penetrating into a housing located in the middle of the electronic system, an auxiliary support for the lower face of the electronic transmission system being provided at the base of the pin.

14. The assembly according to claim 11, wherein the support part has at least one anchor element, projecting from the support part, and designed to be inserted inside the construction element.

15. The assembly according to claim 1, wherein the reception face comprises at least one bearing surface on which the electronic system is supported, and wherein at least one bearing surface is supported by a tab projecting from the reception face including a raised edge that stops in contact with a portion of the periphery of the electronic system.

16. The assembly according to claim 15, wherein the positioning element is a centering element in the form of a pin penetrating into a housing located in the middle of the electronic system, an auxiliary support for the lower face of the electronic transmission system being provided at the base of the pin.

17. A construction element made from a poured or molded material that solidifies progressively during fabrication, wherein the construction element comprises at least one assembly according to claim 1, the face opposite the reception face of the at least one assembly being visible from outside the construction element.

18. A method of producing a construction element according to claim 17 by molding, including:
- putting the electronic system into position on the reception face of the support part,
- placing the support part and electronic transmission system assembly in a mold corresponding to the construction element, on a wall of the mold with temporary adhesion of the assembly on the wall by the face of the support part opposite the reception face of the electronic system,
- pouring the material that will form the construction element into the mold, and
- stripping the construction element, detaching the face opposite the mold wall support part.

19. The construction element according to claim 17, in which the poured or molded material is chosen to be one of the following materials, or a mix of these materials: cement concrete with or without the addition of plant materials, resin concrete, hydraulic concrete, a resin, a plastic or a mix of plastics.

20. A method of producing a construction element according to claim 19 by molding, including:
- putting the electronic system into position on the reception face of the support part,
- placing the support part and electronic transmission system assembly in a mold corresponding to the construction element, on a wall of the mold with temporary adhesion of the assembly on the wall by the face of the support part opposite the reception face of the electronic system,
- pouring the material that will form the construction element into the mold, and
- stripping the construction element, detaching the face opposite the mold wall support part.

* * * * *